United States Patent [19] [11] 4,439,217
Yamabe et al. [45] Mar. 27, 1984

[54] PERMSELECTIVE ELEMENT FOR GAS SEPARATION

[75] Inventors: Masaaki Yamabe, Machida; Katsuyuki Akiyama, Yotsukaidoh, both of Japan

[73] Assignee: Asahi Glass Company, Ltd., Tokyo, Japan

[21] Appl. No.: 439,579

[22] Filed: Nov. 5, 1982

[30] Foreign Application Priority Data

Nov. 27, 1981 [JP] Japan .............................. 56-189264

[51] Int. Cl.$^3$ .............................................. B01D 53/22
[52] U.S. Cl. ...................................... 55/158; 525/61; 526/330; 55/16; 55/68
[58] Field of Search ............... 55/16, 68, 158; 524/43, 524/44, 458; 525/61; 526/3, 242, 319, 330, 331

[56] References Cited

U.S. PATENT DOCUMENTS 3,594,336  7/1971  Bergmeister et al. ............ 524/44 X
3,966,403  6/1976  Papantoniou et al. ......... 526/330 X
3,966,404  6/1976  Papantoniou et al. ......... 526/330 X
3,971,743  7/1976  Breslow ........................... 526/330 X

FOREIGN PATENT DOCUMENTS 51-72976  6/1976  Japan ................................. 55/158

OTHER PUBLICATIONS

Patent Abstracts of Japan, vol. 4, No. 12, Jan. 29, 1980, p. 63G71.
Industrial and Engineering Chemistry, vol. 46, No. 4, 1954, Washington D. W. Brubaker et al., "Separation of gases by plastic membranes", pp. 733–739.

Primary Examiner—Robert H. Spitzer
Attorney, Agent, or Firm—Oblon, Fisher, Spivak, McClelland & Maier

[57] ABSTRACT

A permselective element for gas separation comprises a permselective layer composed of an organic polymer having -OCOC(CH$_3$)$_3$ groups in its side chains. The permselective element is useful for the separation of oxygen/nitrogen.

6 Claims, No Drawings

PERMSELECTIVE ELEMENT FOR GAS SEPARATION

The present invention relates to a permselective element for gas separation, and more particularly to a permselective element comprising a permselective layer composed of an organic polymer having a specific structure and being useful for the separation of oxygen/nitrogen.

It is known to utilize a difference in the permeation velocities of gaseous molecules through a polymer for the separation of gases, and thereby to concentrate a particular component in a gas mixture by means of a permselective element comprising a permselective layer composed of a polymer. Such a method is used for instance for the recovery of oxygen-enriched air from air.

The permeability of gaseous molecules is specific or inherent to the nature of the material constituting the permselective layer. In order to conduct the separation operation in high efficiency, it is necessary to select a material which provides a substantial difference in the permeabilities of the desired component and the coexisting components and which provides great permeability of the desired component. However, the general tendency is such that with a material capable of providing a great difference in the permeabilities, the permeability of the desired component is small, and with a material capable of providing great permeability of the desired component, the difference in the permeabilities of the different components is small. Thus, it has been rarely possible to obtain a material which fully satisfy both requirements.

For instance, for the recovery of oxygen-enriched air from air, it is desired that the oxygen permeability coefficient (hereinafter sometimes referred to simply as "$P[O_2]$") is high and its ratio to the nitrogen permeability coefficient (hereinafter sometimes referred to simply as "$P[N_2]$") is great (the ratio being represented by "$P[O_2]/P[N_2]$": hereinafter sometimes represented simply by "$\alpha$"). However, as materials having $P[O]$ of at least $1 \times 10^{-9}$ cc.cm/cm$^2$· sec.cmHg and $\alpha$ of at least 3, there have been known only poly-4-methylpentene-1 and polyphenyleneoxide.

However, such known materials had disadvantages such that the $\alpha$ values were not yet high enough, and besides, a cumbersome operation such as anion polymerization or an oxydative coupling reaction was required for their preparation.

As a result of extensive researches to overcome the above difficulties, it has been found that an organic polymer having —OCOC(CH$_3$)$_3$ groups in its side chains has a high $P[O_2]$ value and a high $\alpha$ value, and such a polymer can readily be produced and is extremely useful as a material for the permselective layer.

The present invention has been accomplished based on such discovery and provides a novel permselective element for gas separation which comprises a permselective layer composed of an organic polymer having —OCOC(CH$_3$)$_3$ groups in its side chains.

In the present invention, it is important that the permselective layer is composed of an organic polymer having —OCOC(CH$_3$)$_3$ groups. Such a polymer may be prepared by homopolymerization of vinyl pivalate or by copolymerization of vinyl pivalate with other comonomer. It is also possible to produce it by means of a polymer reaction such as an esterification reaction or an ester exchange reaction in which pivalic anhydride or a pivalyl halide is reacted to a polymer containing hydroxyl groups such as cellulose or a polyvinyl alcohol. From the practical production point of view, the homopolymerization or the copolymerization is preferred. The copolymerization is particularly preferred in view of the mechanical properties of the polymer thereby obtained, and the easy control of the conditions for forming an ultrathin film.

The comonomer to be used for the above mentioned copolymerization may be an olefin such as ethylene, propylene, butene-1 or isobutene; a chloroolefin such as vinyl chloride; a fluoroolefin such as vinyl fluoride, vinylidene fluoride, tetrafluoroethylene, chlorotrifluoroethylene or hexafluoropropene; a vinyl ether such as ethyl vinyl ether, isobutyl vinyl ether, neopentyl vinyl ether or cyclohexyl vinyl ether; a fluoro vinyl ether such as perfluoropropyl vinyl ether; acrylic acid or its alkyl ester; methacrylic acid or its alkyl ester; or a vinyl ester.

The kind and amount of the comonomer are optionally selected depending upon the desired properties of the copolymer. For instance, a fluoroolefin, an olefin and a vinyl ether are effectively used for improvement of the durability, the film formability and the flexibility, respectively. The comonomers may be used alone or in combination of two or more different kinds.

If the proportion of the vinyl pivalate units in the copolymer is too small, the $P[O_2]$ value tends to be small. Accordingly, it is preferred that the proportion of the vinyl pivalate units is at least 5 molar % and the total amount of the comonomer units is limited to less than 95 molar %.

The above mentioned polymer having —OCOC(CH$_3$)$_3$ groups may be used in combination with other polymers to improve the film forming properties.

The configuration of the permselective element of the present invention is not critical and it may be formed into various configurations such as a flat membrane, a flared membrane, a spiral configuration, a tubular configuration or a hollow fiber configuration, depending upon the purpose of its particular use. Likewise, the permselective layer may take various forms such as a homogeneous membrane, an asymmetric membrane or a composite membrane and the thickness of the layer may optionally be selected depending upon the purpose of its particular use.

Now, the invention will be described in further detail with reference to Examples.

EXAMPLE 1

Into a 260 cc stainless steel autoclave equipped with a stirrer, 65.5 g of t-butanol, 44.7 g of vinyl pivalate (VPv), 0.038 g of azobisisobutylonitrile and 0.39 g of potassium carbonate were charged and subjected to freeze evacuation by means of liquefied nitrogen. The reaction container was placed and heated in a constant temperature bath and the polymerization was carried out under stirring while maintaining the temperature in the container at 65° C. Upon expiration of 3 hours, the stirring was stopped, and the reaction container was withdrawn and rapidly cooled. The polymer solution in the reaction container was filtered with a glass filter and poured into methanol, whereupon the polymer precipitated. The precipitated polymer was thoroughly washed with methanol and dried under reduced pressure at room temperature for 16 hours and then at 50° C. for 1.5 hours, whereupon 31.9 g of hard resinous polyvinyl pivalate was obtained. The intrinsic viscosity of the polymer was 2.45 as measured in tetrahydrofuran at 30° C.

The polyvinyl pivalate thus obtained was dissolved in ethyl acetate and cast on a glass plate by means of an applicator. After drying it, it was peeled off from the glass surface to obtain a film having a thickness of 32 μm.

The oxygen and nitrogen permeability coefficients (i.e. P[O$_2$] and P[N$_2$]) of this film were $2.1 \times 10^{-9}$ and $0.44 \times 10^{-9}$ cc.cm$^2$/cm.sec.cmHg (STP), respectively, as measured by Seikaken-type gas permeability tester. The ratio (α) of P[O$_2$]/P[N$_2$] was as great as 4.5.

EXAMPLES 2 TO 11

In the same manner as in Example 1, copolymers of VPv with various comonomers were prepared and formed into permselective elements of a thin film shape by the glass casting method. The oxygen and nitrogen permeability coefficients thereof were measured.

The preparation conditions, the yields and the compositions of the respective copolymers are shown in Table 1, and the intrinsic viscosities, the element film thickness and the gas permeability of the respective elements are shown in Table 2.

The compositions of the copolymers were analyzed based on $^{13}$C-NMR, and the intrinsic viscosities were measured in tetrahydrofuran at 30° C.

TABLE 1

| Example | Charged monomers (g) VPv | A | B | Reaction time (hrs) | Yield (g) of copolymer | Copolymer composition VPv/A/B (molar ratio) |
|---|---|---|---|---|---|---|
| 2 | 44.7 | CTFE 40.7 | — | 3.0 | 65.5 | 49.4/50.6/— |
| 3 | 44.7 | TFE 34.9 | — | 3.0 | 62.5 | 51.6/48.4/— |
| 4 | 46.1 | E 1.12 | — | 4.0 | 21.6 | 92.1/7.9/— |
| 5 | 64.5 | P 2.4 | — | 8.2 | 28.0 | 90.3/9.7/— |
| 6 | 64.5 | PPVE 14.9 | — | 3.0 | 60.0 | 91.0/9.0/— |
| 7 | 8.9 | CTFE 40.7 | i-BVE 28.0 | 5.6 | 45.1 | 7.0/52.5/40.6 |
| 8 | 17.8 | CTFE 40.7 | i-BVE 17.5 | 7.0 | 41.3 | 24.5/51.8/23.7 |
| 9 | 8.4 | CTFE 40.7 | BVE 28.0 | 4.4 | 45.4 | 7.2/51.8/41.0 |
| 10 | 44.7 | CTFE 32.5 | TFE 7.0 | 3.5 | 63.5 | 50.5/39.6/9.9 |
| 11 | 44.7 | EMA 40.0 | — | 5.0 | 52.0 | 41/59/— |

VPv: vinyl pivalate
CTFE: chlorotrifluoroethylene
TFE: tetrafluoroethylene
E: ethylene
P: propylene
PPVE: perfluoropropyl vinyl ether
i-BVE: isobutyl vinyl ether
BVE: a mixture of i-BVE/n-butyl vinyl ether in equivalent molar ratio.
EMA: ethyl methacrylate

TABLE 2

| Example | Intrinsic viscosity | Element film thickness (μm) | Gas permeability P[O$_2$] | P[N$_2$] | α |
|---|---|---|---|---|---|
| 2 | 1.45 | 29 | 1.03 | 0.22 | 4.6 |
| 3 | 1.90 | 30 | 1.04 | 0.25 | 4.2 |
| 4 | 1.93 | 32 | 1.21 | 0.28 | 4.4 |
| 5 | 1.04 | 46 | 1.38 | 0.30 | 4.6 |
| 6 | 1.74 | 36 | 2.02 | 0.46 | 4.4 |
| 7 | 0.46 | 38 | 0.72 | 0.15 | 4.8 |
| 8 | 0.75 | 40 | 0.87 | 0.19 | 4.6 |
| 9 | 0.99 | 23 | 0.81 | 0.19 | 4.2 |
| 10 | 1.65 | 39 | 0.89 | 0.20 | 4.5 |
| 11 | 1.34 | 28 | 0.66 | 0.16 | 4.2 |

The unit for both P[O$_2$] and P[N$_2$] is $10^{-9}$ cc · cm/cm$^2$ · sec · cmHg

EXAMPLE 12

One gram of cotton linter was immersed in distilled water overnight and then dehydrated, and 4.5 g of pivalic anhydride was reacted thereto in methylene chloride in the presence of 0.04 g of sulfuric acid as the catalyst for pivalic acid esterification.

An ethyl acetate-soluble component was separated from the reaction mixture and the ethyl acetate solution thereby obtained was cast on a glass plate in the same manner as in Example 1 to obtain a thin film having a thickness of 25 μm. The P[O$_2$] and P[N$_2$] values of this film were $0.50 \times 10^{-9}$ and $0.12 \times 10^{-9}$ (the unit being as mentioned above), respectively, and the α value was 4.2. The introduction of —OCOC(CH$_3$)$_3$ groups was confirmed by the IR spectrum of this film.

EXAMPLE 13

A porous asymmetric polysulfone membrane (pore diameter: 30 to 50 Å) having a thickness of about 60 μm and provided with a polyethylene terephthalate nonwoven cloth backing layer having a thickness of about 190 μm was used as a supporting layer, and polysiloxane was coated thereon in a thickness of about 2 μm. Ten ultrathin layers of the copolymer obtained in Example 7 prepared by a casting-on-water method, were laminated thereon. The composite film thus obtained was a high performance permselective element having an oxygen permeation flux of 0.19 m$^3$/m$^2$.h.atm and an oxygen permeation flux/nitrogen permeation flux ratio of 3.9.

We claim:

1. A permselective element for gas separation which comprises a permselective layer composed of an organic polymer having —OCOC(CH$_3$)$_3$ groups in its side chains.

2. The permselective element according to claim 1 wherein the organic polymer is polyvinyl pivalate.

3. The permselective element according to claim 1 wherein the organic polymer is a copolymer of vinyl pivalate with other comonomer.

4. The permselective element according to claim 3 wherein the proportion of the vinyl pivalate units in the copolymer is at least 5 molar %.

5. The permselective element according to claim 1 wherein the organic polymer is the one formed by a polymer reaction.

6. The permselective element according to claim 5 wherein the polymer reaction is pivalic acid esterification of a polymer containing hydroxyl groups.

* * * * *